United States Patent
Amesoeder et al.

(10) Patent No.: US 7,648,545 B2
(45) Date of Patent: Jan. 19, 2010

(54) FILTER SEALING SYSTEM

(75) Inventors: Dieter Amesoeder, Bietigheim-Bissingen (DE); Sabine Fleck, Ettlingen (DE); Pius Trautmann, Dingolfing (DE)

(73) Assignee: Mann + Hummel GmbH, Ludwigsburg (DE)

( * ) Notice: Subject to any disclaimer, the term of this patent is extended or adjusted under 35 U.S.C. 154(b) by 270 days.

(21) Appl. No.: 11/473,112

(22) Filed: Jun. 23, 2006

(65) Prior Publication Data

US 2006/0288674 A1 Dec. 28, 2006

(30) Foreign Application Priority Data

Jun. 24, 2005 (DE) .................... 10 2005 029 750

(51) Int. Cl.
*B01D 39/14* (2006.01)
*B01D 46/52* (2006.01)

(52) U.S. Cl. .................. 55/502; 55/385.3; 55/498; 55/503; 55/521

(58) Field of Classification Search ............ 55/385.3, 55/498, 502, 503, 504, 521; 123/198 E
See application file for complete search history.

(56) References Cited

U.S. PATENT DOCUMENTS

| | | | |
|---|---|---|---|
| 6,179,890 B1 * | 1/2001 | Ramos et al. ............... 55/482 |
| 6,190,432 B1 * | 2/2001 | Gieseke et al. ............ 55/385.3 |
| 6,293,984 B1 * | 9/2001 | Oda et al. ................... 55/497 |
| 6,348,084 B1 * | 2/2002 | Gieseke et al. ............... 95/273 |
| 6,350,291 B1 * | 2/2002 | Gieseke et al. ............ 55/385.3 |
| 6,517,598 B2 * | 2/2003 | Anderson et al. ............ 55/498 |
| 6,547,857 B2 * | 4/2003 | Gieseke et al. ............... 95/273 |
| 6,610,117 B2 * | 8/2003 | Gieseke et al. ............ 55/385.3 |
| 6,610,126 B2 * | 8/2003 | Xu et al. ..................... 95/273 |
| 6,673,136 B2 * | 1/2004 | Gillingham et al. ........... 95/273 |
| 6,746,518 B2 * | 6/2004 | Gieseke et al. ............... 95/273 |
| 6,783,565 B2 * | 8/2004 | Gieseke et al. ............ 55/385.3 |
| 6,852,141 B2 * | 2/2005 | Bishop et al. ............ 55/385.3 |
| 6,878,190 B1 * | 4/2005 | Xu et al. ..................... 95/273 |
| 6,966,940 B2 * | 11/2005 | Krisko et al. ................ 55/497 |

(Continued)

FOREIGN PATENT DOCUMENTS

EP   1 159 052 B1   11/2003

(Continued)

OTHER PUBLICATIONS

European Search Report dated Oct. 4, 2006 (five (5) pages).

*Primary Examiner*—Michael A Marcheschi
*Assistant Examiner*—Robert A Clemente

(57) ABSTRACT

An axial flow filter element including alternating flat and folded media layers forming axial channels, one end of a first group of channels being sealed and the remaining channels being sealed at the other end so fluid flowing through the element passes from channels of the first group through the filter media to channels of the second group to exit the filter; channels of the second group adjoining each side of channels of the first group spaced from the edge of the filter element so fluid flows through the entire lateral area of the first channels; an annular sealing collar adjacent an axial end face of the filter element connected to the exterior of the element to seal the element in a housing; part of the collar projecting axially beyond the end face of the element, and a frame connected to the projecting part for radially supporting the collar.

11 Claims, 1 Drawing Sheet

U.S. PATENT DOCUMENTS

| | | | |
|---|---|---|---|
| 6,974,490 B2 * | 12/2005 | Gillingham et al. | 55/486 |
| 6,997,968 B2 * | 2/2006 | Xu et al. | 55/495 |
| 7,001,450 B2 * | 2/2006 | Gieseke et al. | 95/273 |
| 7,211,124 B2 * | 5/2007 | Gieseke et al. | 55/357 |
| 7,261,756 B2 * | 8/2007 | Merritt | 55/482 |
| 7,261,757 B2 * | 8/2007 | Duffy | 55/502 |
| 7,270,692 B2 * | 9/2007 | Gillingham et al. | 55/486 |
| 7,303,604 B2 * | 12/2007 | Gieseke et al. | 55/385.3 |
| 7,318,851 B2 * | 1/2008 | Brown et al. | 55/498 |
| 7,323,029 B2 * | 1/2008 | Engelland et al. | 55/502 |
| 7,351,270 B2 * | 4/2008 | Engelland et al. | 55/502 |
| 2001/0003893 A1 * | 6/2001 | Ramos et al. | 55/482 |
| 2005/0166561 A1 * | 8/2005 | Schrage et al. | 55/498 |
| 2006/0091061 A1 * | 5/2006 | Brown | 210/440 |
| 2007/0186528 A1 * | 8/2007 | Wydeven et al. | 55/498 |
| 2008/0110142 A1 * | 5/2008 | Nelson et al. | 55/357 |

FOREIGN PATENT DOCUMENTS

| | | |
|---|---|---|
| WO | WO 2004/020075 A2 | 3/2004 |
| WO | WO 2006/012386 A2 | 2/2006 |

\* cited by examiner

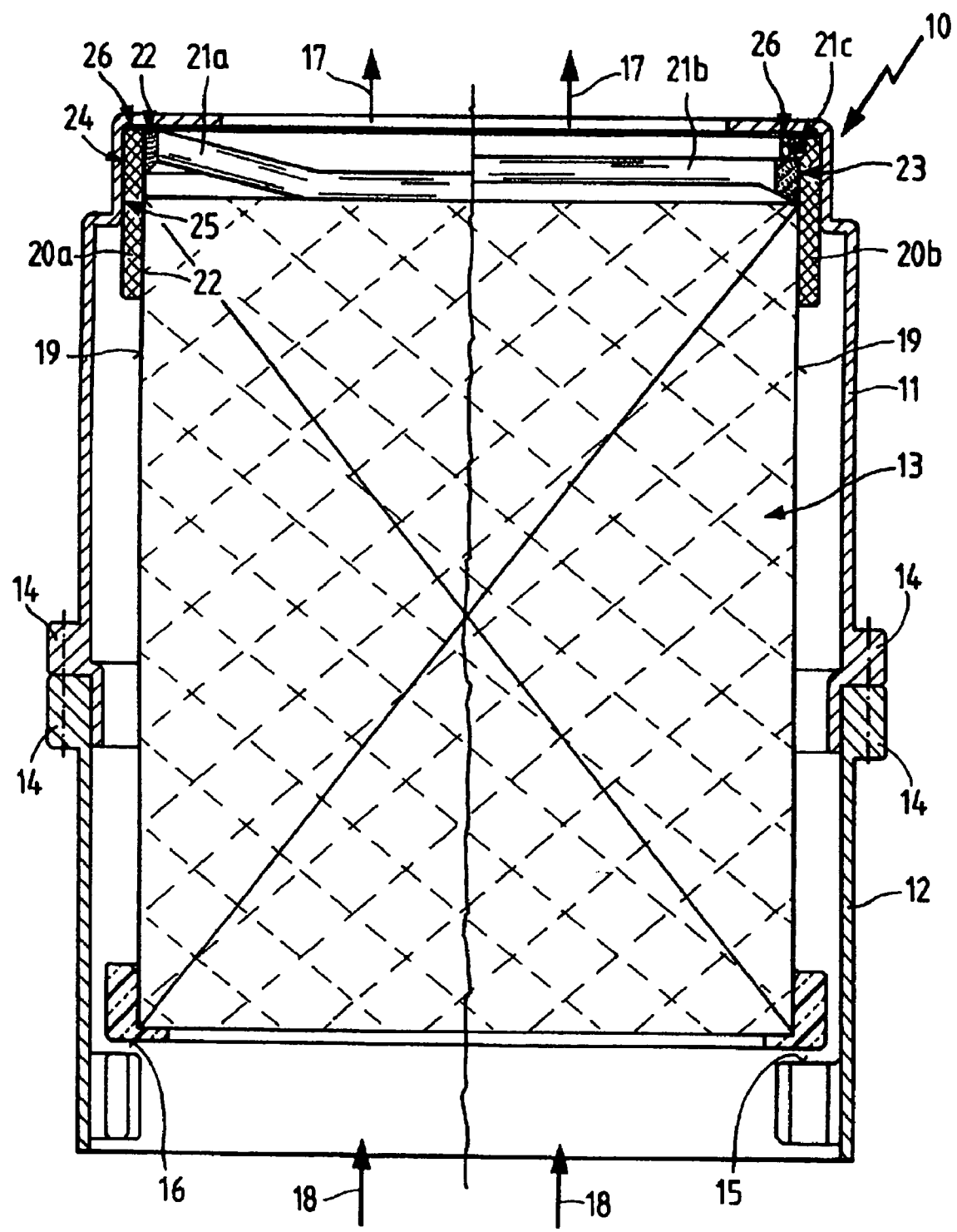

FILTER SEALING SYSTEM

BACKGROUND OF THE INVENTION

The present invention relates to an air filter system and to a method for maintaining an air filter having an axial flow air filter element.

Axial flow filter elements are used in many areas in which a gas or a liquid is to be filtered. These elements are inserted in many types of housings for this purpose and must be replaced or cleaned as directed after reaching a specific load or after predefined maintenance intervals.

U.S. Pat. No. 6,350,291 (=EP 1,159,052) discloses a filter element having a frame construction, which is bonded annularly to the jacket surface of the filter element in the area of one of the axial end faces and has an extension which projects axially beyond the axial end face. In turn, a sealing element is arranged on the extension, which is positioned at least partially around the external peripheral surface of the extension. In this way, a tight connection to the interior of an air filter housing is ensured.

It is disadvantageous for this purpose that the interior of the frame construction for attachment to the jacket surface of the filter element may not have any deviation in diameter from the external diameter of the jacket surface, since otherwise there may be a connection between the unfiltered and filtered sides of the filter element. For this purpose, very tight manufacturing tolerances must be maintained both for the frame construction and for the filter element jacket, which are associated with increased costs.

SUMMARY OF THE INVENTION

It is therefore an object of the invention to provide an improved sealing system for an axial flow filter.

Another object of the invention is to provide a sealing system for an axial flow filter element which avoids the need for excessively tight manufacturing tolerances.

A further object of the invention is to provide an axial flow filter sealing system which is simple and cost-effective to handle and manufacture.

These and other objects are achieved in accordance with the present invention by providing an axial flow filter element having an inflow face at one axial end thereof, said filter element comprising at least one flat layer and at least one folded layer, the at least one flat layer being alternately arranged with the at least one folded layer in such a way that channels having an open, in particular triangular, cross-section are produced; each channel of a first group of channels being tightly sealed at one end, and a second group comprising each of the remaining channels not included in said first group, being tightly sealed at the other end in such a way that a fluid to be filtered must pass through one of said layers to filter the fluid when flowing through the filter element from an inflow side, formed by one axial end face of the filter element, to an discharge side, formed by the other axial end face of the filter element; a seal for sealing the inflow side from the discharge side of the filter element in a housing part; both the at least one flat layer and also the at least one folded layer comprising filter media through which a fluid can flow; a channel of the second group adjoining each side forming the open cross-section of those channels of the first group which are spaced from the edge of the filter element, so that fluid can flow through the entire area of the channels of the first group except for the folded edges of the channels, in which the seal for sealing the inflow side from the discharge side of the filter element in the housing comprises a peripheral seal in the form of an annular collar arranged at an axial end face of the filter element and connected via an axial section to an outer jacket surface of the filter element, with a part of the annular collar projecting axially beyond the adjacent axial end face of the filter element, and a frame element connected to the axially projecting part of the annular collar in such a way that the frame element supports the annular collar against radial forces exerted on the collar.

In accordance with another aspect of the invention, the objects are achieved by providing a method for maintaining an air filter having a housing having an internal annular sealing face, said method comprising axially inserting a filter element as described above into the housing until a radially sealing connection is produced between an annular sealing collar of the filter element and the housing.

The filter element according to the present invention for an axial fluid flow with axial end face inflow has a filter medium having axial flow through it, a seal for sealing the inflow side from the discharge side of the filter element on the exterior of the filter medium and preferably a support body arranged centrally in the filter element. The filter medium comprises alternately arranged flat and folded filter layers for this purpose, the flat layer being arranged alternately with the folded layer in such a way that channels having an open, in particular triangular, cross-section are produced. The resulting channels are alternately closed at one or the other of the axial end faces, so that the fluid to be filtered has to pass through one of the filter media layers, which are provided for filtering the fluid, when flowing through the filter element from an inflow side—formed by one axial end face of the filter element—to a discharge side—formed by the other axial end face.

In one preferred embodiment, a support body is arranged centrally in the filter medium and thus enclosed by the channels, so that it extends axially essentially up to at least one axial end face of the filter element. The layers of the filter medium are preferably produced for this purpose from a filter paper, but may also be made, for example, from a completely synthetic medium. In such a case the folded layer must be supported by impregnation of the completely synthetic medium. The filter element may have a polygonal, round, elliptical, or oval cross-sectional shape, but is preferably round on the outer edges and constructed linearly in the form of an oval between the outer edges.

The preferably used support body, which is arranged centrally in the filter element, is preferably manufactured in the injection molding method, but may also be produced from another material such as plastic and in another production method. Due to the alternating closure of the end of the channels through which flow is to occur, the complete area of the surrounding filter medium of the first inflow-side channels may have flow through it through suitable positioning, in order to reach the second, discharge side channels. For this purpose, only the outermost channels at the periphery of the filter element form an exception.

A seal is provided to produce a seal between the inflow side and the discharge side of the filter element when the filter element is inserted into a mating housing. The seal comprises a peripheral seal in the form of an annular collar which is arranged at one axial end face of the filter element. The entire circumference of an axial partial section of the seal presses on one side against the jacket surface of the filter element and the entire circumference of a sealing surface presses on the other side against a corresponding housing sealing surface.

A further partial section of the annular collar extends axially along the axial end face of the filter element and is connected to a frame element. The frame element may be made of metal or synthetic resin material (i.e., plastic) and is preferably constructed annularly. However, it is also possible to connect only segments of the frame element to the axially projecting part of the annular collar such that the frame element assumes the form of spokes of a wagon wheel without a continuous outer ring, for example. The frame element advantageously provides radial support against forces acting externally on the seal.

A further advantage is the resulting centering effect of the sealing collar in a housing. Because the seal now presses completely against the filter element and the housing wall, an effective seal between inflow and discharge sides may be ensured.

A according to one advantageous embodiment of the present invention, the peripheral seal and/or the peripheral sealing collar comprises an elastomer and is cast or injection molded on the jacket surface of the filter element. Through this type of bond between the seal and the jacket surface of the filter element, a complete seal between inflow and discharge sides is ensured. Through the use of an elastomer for the seal, secure centering in the housing and a reliable seal are ensured even in the event of tolerance differences between the sealing surface of the seal and the sealing surface of the housing. Due to the elasticity of the elastomer, it can adapt itself to irregularities in the sealing surface of the housing, the continuous contact against the sealing surface of the housing being especially pronounced due to the compressibility of the elastomer seal.

With a seal cast or injection molded on the jacket surface of the filter element, it is advantageous if the frame element is embedded on at least two sides in the seal and is connected in a formfitting way thereto. The frame element, which is preferably made of plastic or metal, is also embedded directly in the seal when it is cast or injection molded on the jacket surface, so that the formfitting bond also results in this case. The frame element is thus bonded captively to the sealing element, and irregularities may easily be compensated for through the casting or injection molding process.

In an alternate embodiment, the peripheral seal is again made of an elastomer and adhesively bonded to the jacket surface of the filter element or pushed onto a device designed correspondingly thereto. In this case, the adhesive bond between the elastomer seal and the jacket surface of the filter element ensures the required fluid tightness between inflow and discharge sides.

In this case, it is especially advantageous if the frame element is also bonded via an adhesive method to the interior of the axially projecting part of the seal. An especially intimate bond between frame element and elastomer seal is also produced by this adhesive method, so that the absorption of a radially inwardly acting force remains ensured under all operating conditions.

According to another advantageous embodiment of the present invention, the seal comprises a thermoplastic elastomer (TPE). The special advantages of TPEs in the field of sealing two parts to one another are described in the relevant textbooks, such as the plastic handbook, and thus do not need to be explained further here.

It is also alternatively advantageous to construct the seal from a polyurethane foam. This is very strongly compressible, may be processed easily and simply, and has also been used over a long period of time as a seal material in the field of sealing filter elements relative to housing parts.

According to another advantageous embodiment of the present invention, the axially projecting part of the seal is essentially in tight engagement with a mating face of a housing provided for receiving the filter element to form a seal. In this case, this may be either the radially inner face of the seal annular collar or the radially outer face of the seal annular collar. Preferably it is the radially outer face of the seal annular collar.

If the radially outer sealing face of the seal is used, it is advantageous if it is oriented parallel to the jacket surface of the filter element. This proves to be advantageous particularly if the housing shape follows the external shape of the filter element. Slight angular offsets may also be compensated for by the compressibility of the elastomer seal element.

Alternatively, the outer sealing surface of the seal may have a shape tapering conically in the direction of the free axial end of the annular collar. In this case, a type of insertion bevel results due to the radially conically tapering shape of the seal outer surface, in order to ensure secure contact of the seal in the entire area of the housing sealing surface in the event of constricted housing conditions.

To maintain an air filter having an air filter element like that described above, the filter element is inserted axially into the housing so that the seal annular collar presses radially against mating sealing surfaces of the housing. The seal annular collar offers the possibility of providing an axial stop in this case and, after reaching the axial stop, ensures completely secure mounting of the replacement filter element.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to an illustrative preferred embodiment shown in the accompanying drawing FIGURE which is a sectional elevation view of an axial flow filter with a sealing system according to the invention.

DETAILED DESCRIPTION OF PREFERRED EMBODIMENTS

The single drawing FIGURE shows an air filter 10 comprising an upper housing part 11 and a lower housing part 12 having a filter element 13 situated therein. The filter element 13 is a filter element having axial flow having alternately closed, axially extending channels. Preferably, paper, synthetic material, or a nonwoven material is used as the filter medium. The upper and lower housing parts 11 and 12 are connected to one another via connector 14. The connector may comprise clips, screws, or any other detachable type of connection known in the art.

An axial stop 15 is formed by the housing in the lower area of the lower housing part 12, which axially supports and fixes the filter element 13 in position when the two housing parts 11 and 12 are assembled. A corresponding or mating, preferably peripheral, stop cushion 16 is constructed on the lower axial end face of the filter element 13 in the vicinity of the axial stop 15. This may comprise an elastomer, preferably a polyurethane foam, for example, which is cast or injection molded directly on the filter element 13. Furthermore, oscillation damping and the possibility of good axial and radial fixation of the filter element 13 advantageously are achieved in this way.

The axial end face of the upper housing part forms an air outlet 17 for the filtered air, and the intake of air 18 occurs in the lower area of the lower housing part 12. The filter housing part 12 is not shown closed in the lower area, since it is possible here to connect, inter alia, a pre-separator, for example, a multi-cyclone. If the pre-separator is not required, it is possible to cause the air intake to occur through the axial end face of the lower housing part 12 or alternatively through an entry channel situated laterally below the filter element 13.

As the outermost layer of the filter, the filter element 13 comprises a jacket 19, which encloses the filter element 13 around its entire circumference. On the left side of the FIGURE, an annular sealing collar 20a is bonded to the jacket surface 19 via a nonremovable bonding method, such as an adhesive bond 22. On the right side, an annular sealing collar 20b is molded directly onto the jacket surface 19 of the filter element 13 through a casting or injection molding method. A formfitting tight bond between seal annular collar 20b and filter element 13 also results in this way. As can be seen in the FIGURE, the radially outer and inner surfaces of annular sealing collars 20a and 20b each have a substantially linear or straight line configuration in the axial direction of the filter element 13 and extend parallel to each other.

A frame element 21a is also bonded via an adhesive bond 22 onto the radially inward side of the seal annular collar 20a. This frame element 21a may be a peripheral frame in the form of a circular ring, but may also merely represent a frame element 21a only bonded in segments to the seal annular collar 20a. The frame element 21a may be constructed in the shape of a star or a polygon, for example.

Two alternative ways of attaching the frame elements 21b, 21c are shown on the right side. At least two faces of the frame element 21b are embedded in the seal annular collar 20b, so that a formfitting connection also results here. The frame element 21b is also used directly in the manufacturing process of the seal annular collar 20b for this purpose. The frame element 21c offers an alternative thereto, which only represents an insert in the form of a circular ring in the seal annular collar 20b. The frame elements may be manufactured from metal or plastic for this purpose. The frame elements 21a and 21b still have shapes similar to wagon wheels for this purpose, which also results in good force support in the event of external forces acting radially on the seal annular collars 20a or 20b.

With the frame elements 21a and 21b, it is also possible, if a support core (not shown here) is used inside the filter element 13, to bond the frame elements 21a and 21b to the support core via a removable bonding method and thus achieve a further increase of the support. The embedding of the end 23 of the frame element 21b is thus performed directly in the same manufacturing step as the bonding of the annular sealing collar 20b to the filter element 13. The annular sealing collars 20a and 20b function here in conjunction with the upper housing part 11 as an axial stop 26 and, in addition, as a radial seal via the combination of a sealing face 24 of the seal annular collar 20a and 20b with an internal sealing face 25 of the upper housing part 11. It may be seen that the sealing face is essentially produced by the part of the seal annular collar 20a or 20b projecting axially beyond the axial end face of the filter element 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An axial flow filter element having an inflow face at one axial end thereof, said filter element comprising:
   at least one flat layer and at least one folded layer, the at least one flat layer being alternately arranged with the at least one folded layer in such a way that channels having an open cross-section are produced;
   each channel of a first group of channels being tightly sealed at one end, and a second group comprising each of the remaining channels not included in said first group, being tightly sealed at the other end in such a way that a fluid to be filtered must pass through one of said layers to filter the fluid when flowing through the filter element from an inflow side, formed by one axial end face of the filter element, to an discharge side, formed by the other axial end face of the filter element;
   a seal for sealing the inflow side from the discharge side of the filter element in a housing part;
   both the at least one flat layer and also the at least one folded layer comprising filter media through which a fluid can flow;
   a channel of the second group adjoining each side forming the open cross-section of those channels of the first group which are spaced from the edge of the filter element, so that fluid can flow through the entire area of the channels of the first group except for the folded edges of the channels, wherein:
   the seal for sealing the inflow side from the discharge side of the filter element in the housing comprises a peripheral seal in the form of an annular collar arranged at an axial end face of the filter element and connected via an axial section to an outer jacket surface of the filter element, with a part of the annular collar projecting axially beyond the adjacent axial end face of the filter element, and a frame element connected to the axially projecting part of the annular collar in such a way that the frame element supports the annular collar against radial forces exerted on the collar, the frame element being formed as radial spokes of a wheel lacking a continuous outer ring;
   said filter element having an outer peripheral shape, and said frame element having an outer peripheral shape which is the same as the outer peripheral shape of the filter element;
   said annular collar being connected only to the outer jacket surface of the filter element, whereby said annular collar does not block any of the axially extending channels of the filter element; and
   said annular collar having a radially outer surface which has a substantially linear configuration in the axial direction of the filter element,
   wherein the peripheral seal comprises an elastomer body glued to the jacket surface of the filter element, and the frame element is adhesively bonded to the interior of the axially projecting part of the seal.

2. A filter element according to claim 1, wherein said channels have a triangular cross section.

3. A filter element according to claim 1, wherein the peripheral seal comprises an elastomer body cast or injection molded on the jacket surface of the filter element.

4. A filter element according to claim 3, wherein the seal is cast or injection molded around at least two sides of the frame element so that the frame element is embedded in the seal and connected to the seal in a form-fitting manner.

5. A filter element according to claim 1, wherein the seal is comprised of a thermoplastic elastomer.

6. A filter element according to claim 1, wherein the seal is comprised of a polyurethane foam.

7. A filter element according to claim 1, wherein the axially projecting part of the seal sealingly engages a mating face of a housing provided for receiving the filter element.

8. A filter element according to claim 1, wherein the radially outer sealing face of the seal is oriented essentially parallel to the jacket surface of the filter element.

9. A filter element according to claim 1, wherein the radially outer sealing face of the seal has a shape tapering conically in the direction of the axial free end.

10. A method for maintaining an air filter having a housing having an internal annular sealing face, said method comprising axially inserting a filter element according to claim 1 into the housing until a radially sealing connection is produced between a seal annular collar of the filter element and the housing.

11. A filter element according to claim 1, wherein the radially inner surface of the annular collar has a substantially linear configuration in the axial direction of the filter element parallel to the outer surface of the annular collar.

\* \* \* \* \*

UNITED STATES PATENT AND TRADEMARK OFFICE
CERTIFICATE OF CORRECTION

| | | |
|---|---|---|
| PATENT NO. | : 7,648,545 B2 | Page 1 of 1 |
| APPLICATION NO. | : 11/473112 | |
| DATED | : January 19, 2010 | |
| INVENTOR(S) | : Amesoeder et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Twenty-third Day of November, 2010

David J. Kappos
*Director of the United States Patent and Trademark Office*